UNITED STATES PATENT OFFICE.

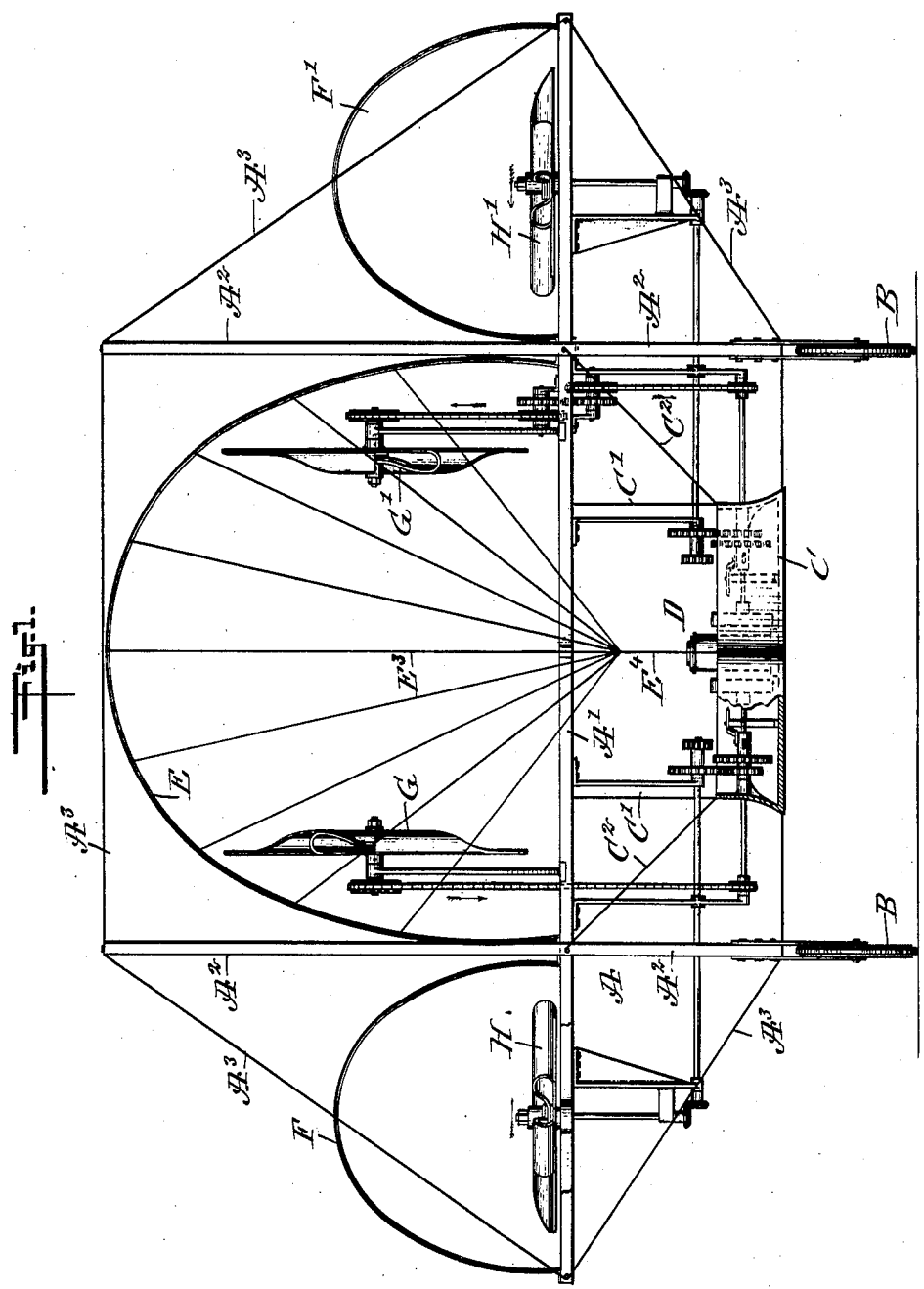

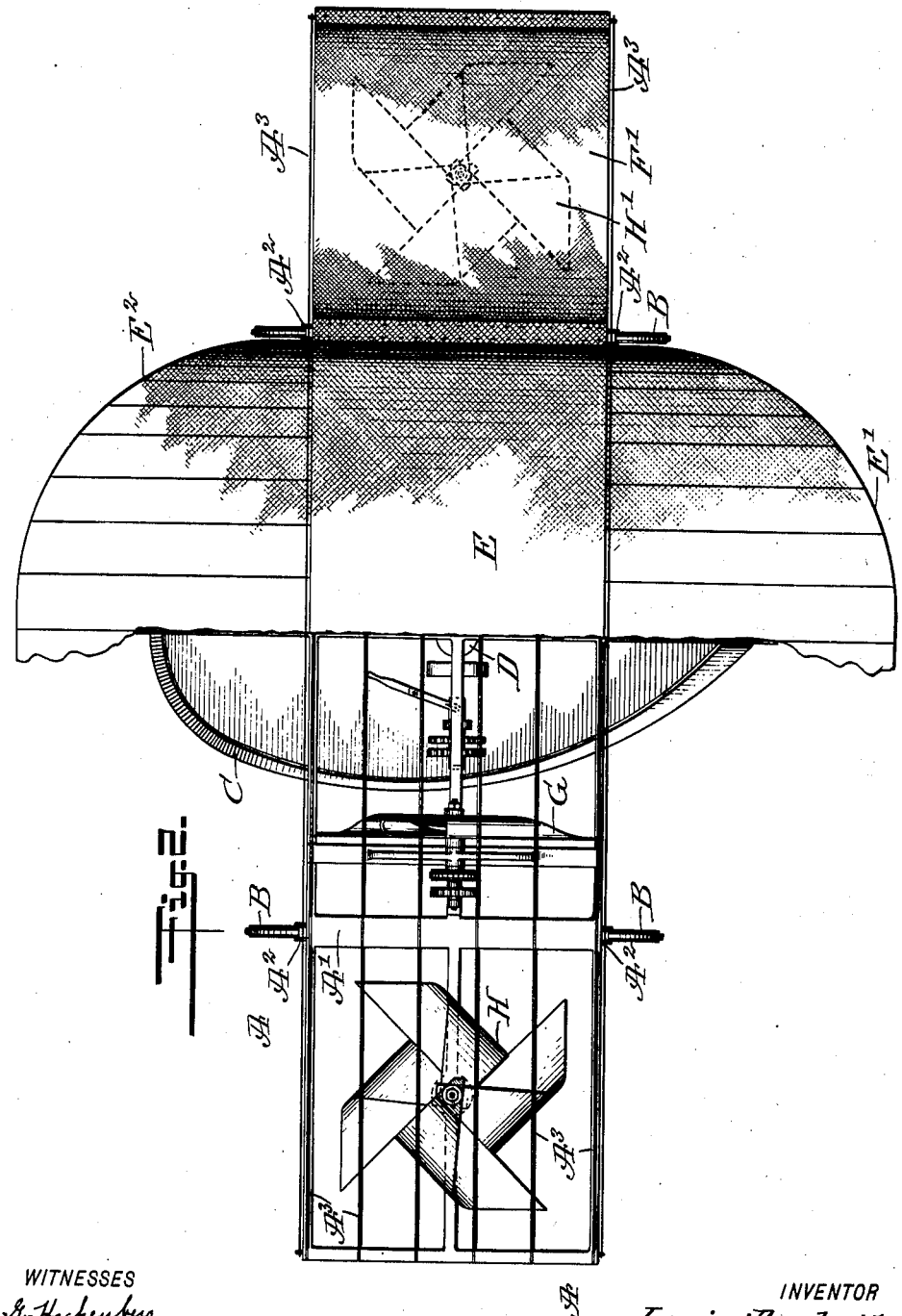

LOUIS ARNHEITER, OF JERSEY CITY, NEW JERSEY.

AIRSHIP.

958,460.  Specification of Letters Patent.  Patented May 17, 1910.

Application filed October 6, 1908. Serial No. 456,499.

*To all whom it may concern:*

Be it known that I, LOUIS ARNHEITER, a citizen of the United States, and a resident of Jersey City, in the county of Hudson and State of New Jersey, have invented a new and Improved Airship, of which the following is a full, clear, and exact description.

The object of the invention is to provide a new and improved air ship or aeronef, arranged to provide a large sustaining surface, and to permit of conveniently raising, lowering, propelling and steering the air ship in any desired direction.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in both views.

Figure 1 is a front elevation of the improvement, parts being in section; and Fig. 2 is a plan view of the same, parts being broken out.

The skeleton frame-work A for the air ship, consists essentially of an open-work platform A' and standards A² connected with the platform A' and braced with the same by suitable braces A³, as indicated in the drawings. The lower ends of the standards A² are provided with wheels B for supporting the air ship on the ground or on a suitable platform. A car C is suspended from the platform A' by suitable brackets C', and braces C², and in the said car C is arranged a motor D of any approved construction.

A main sustaining surface or aeroplane E is mounted on top of the platform A' and is in the form of an arch, open at the front, rear and bottom, as plainly indicated in the drawings, and on opposite sides of this main sustaining surface E are arranged similar but smaller auxiliary sustaining surfaces F and F', likewise in the form of an arch, parallel to the sustaining surface E. Under the auxiliary sustaining surfaces F and F' are mounted the raising and lowering wheels H and H', driven from the motor D by a suitable gearing, and under the main sustaining surface E are mounted the propelling wheels G and G', likewise driven from the motor D by suitable connections, as indicated in the drawings. The wheels H and H' are disposed horizontally and when rotated serve to lift the air ship, and the propellers G and G' are disposed vertically and when rotated serve to propel the air ship either in a forward or a backward direction, it being understood that the wheels G and G' rotate in opposite directions.

The front and rear ends E', E² of the main sustaining surface E are preferably made in flexible, longitudinally-extending sections, as indicated in Fig. 2, and to the sections are attached cords E³ connected with a main cord E⁴, under the control of the operator located in the car C, so that when the cord E⁴ is pulled the front and rear ends E', E² are swung downward, to partly close the front and rear ends of the main sustaining surface E, thereby forming a parachute out of the main sustaining surface E, in case of accident to the machinery, to insure slow descending to the ground.

By arranging the main sustaining surface E in the form of an arch-shaped hood, an exceedingly large surface or aeroplane is provided in a comparatively small space, to properly support the air ship while in the air, and to present little resistance to the air ship when moving forward and backward through the air. The car C is preferably in the form of a boat capable of floating on the water if required, and to allow the aerial vessel to again rise from the water.

It will be observed that in the form of propeller shown, the blades are arched and have their openings in the plane of the wheel, so that when the said propellers rotate they exert a drawing action on the air immediately in front thereof, which air is forced toward the center of the propeller, and a forward motion is thus produced, since the tendency of the vane is to travel forward and as the air is discharged rearwardly the reaction produced thereby is also utilized. A travel of the current of air through the arched sustaining surface results, and by tilting such surface an upwardly inclined movement may be obtained. The lifting screws assist in this movement in the same manner, the blades of the wheels being constructed in the same manner as the blades of the wheels of the propeller.

Having thus described my invention, I claim as new and desire to secure by Letters Patent:

1. An air ship, comprising a skeleton frame having a platform, a car supported on the said frame, and a main sustaining surface mounted on the said frame in the form of an arch open at the front, rear and bottom, auxiliary sustaining surfaces on the said frame and located on opposite sides of the said main sustaining surface and parallel thereto, the auxiliary sustaining surfaces being each in the form of an arch, and raising and lowering propellers mounted on the said frame under the said auxiliary sustaining surfaces.

2. An air ship, comprising a skeleton frame having a platform, a car supported on the said frame and a main sustaining surface mounted on the said frame in the form of an arch open at the front, rear and bottom, auxiliary sustaining surfaces on the said frame and located on opposite sides of the said main sustaining surface and parallel thereto, the auxiliary sustaining surfaces being each in the form of an arch, a car supported on the said frame below the said main stationary surface, a motor on the said car, propellers under the said main sustaining surface and driven from the said motor for propelling the air ship forward or backward, and raising and lowering propellers mounted under the said auxiliary sustaining surfaces and driven from the said motor.

3. An air-ship comprising an open-work platform, standards connected with the platform intermediate its ends, and extending above and below the platform, wheels on the lower ends of the standards, a car suspended from the platform inside of the standards, an arched aeroplane on top of the platform, and inside of the standards, side planes on each side of the standards, lifting propellers below the latter planes, and guiding propellers inside of the former plane.

In testimony whereof I have signed my name to this specification in the presence of two subscribing witnesses.

LOUIS ARNHEITER.

Witnesses:
THEODORE ARNHEITER,
JOHN LECHLER.